E. HELD.
DYNAMO ELECTRIC MACHINE.
APPLICATION FILED NOV. 23, 1912.
1,066,494.
Patented July 8, 1913.
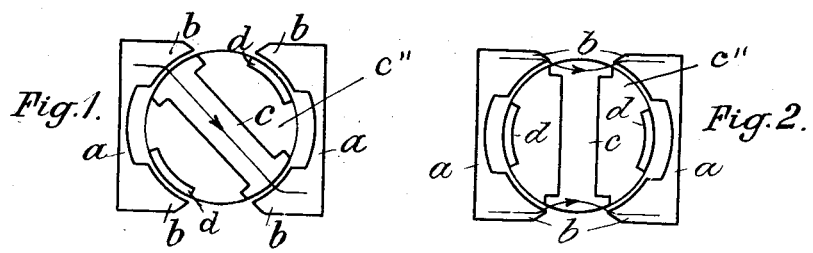
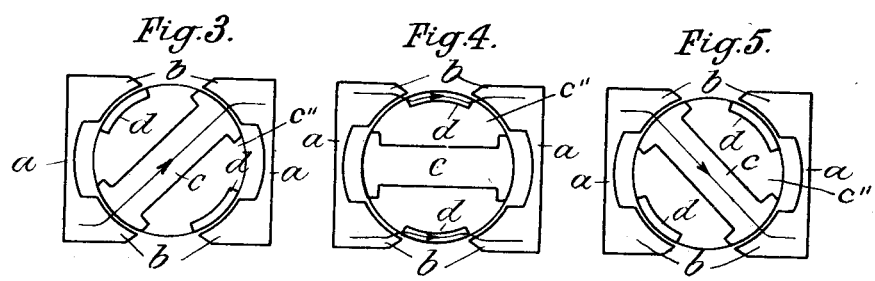
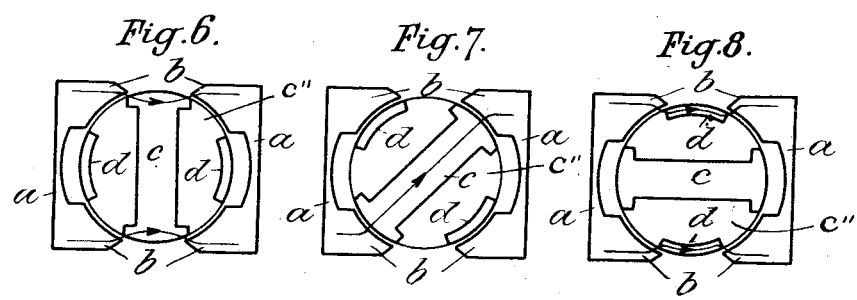
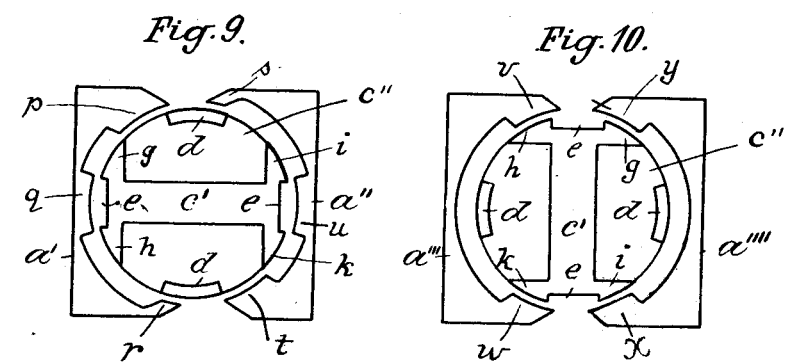
Witnesses:
Katheryne Koch
Daniel Holmgren.
Inventor:
Eugen Held
by Friesen & Jumper
Att'ys.

UNITED STATES PATENT OFFICE.

EUGEN HELD, OF STUTTGART, GERMANY.

DYNAMO-ELECTRIC MACHINE.

1,066,494.

Specification of Letters Patent.

Patented July 8, 1913.

Application filed November 23, 1912. Serial No. 733,070.

*To all whom it may concern:*

Be it known that I, EUGEN HELD, a subject of the King of Wurttemberg, and residing at Stuttgart, Germany, have invented a new and useful Dynamo-Electric Machine, of which the following is a specification.

This invention relates to a dynamo electric machine of novel construction by means of which a greater number of current maxima than heretofore may be obtained during each revolution of the armature, so as to more particularly adapt the machine for the operation of tachometers, frequency-meters and similar instruments.

In the accompanying drawing: Figure 1 is a diagrammatic view of a dynamo electric machine embodying my invention; Figs. 2–8 are similar views illustrating consecutive positions of the armature; Fig. 9 is a diagrammatic view of a modification of my dynamo electric machine, and Fig. 10 a similar view of a further modification.

My dynamo electric machine comprises essentially a pair of opposed shanks $a$, $a$ of a bipolar field magnet, at least one of which shanks is furnished with a plurality of polar projections $b$ of the same sign, Figs. 1 to 8 showing each shank $a$ provided with two such projections. Intermediate the poles is rotatably mounted a double T armature $c$, the web of which is provided with the necessary windings (not shown). The arrangement is such that the magnetic conductivity between the polar projections of opposite sign is maintained almost constant for which purpose magnetizable segments or magnetic flux conductors are provided intermediate the armature poles. For supporting these conductors, I prefer to attach to each end of armature $c$, a disk $c''$ of non-magnetizable material, to which in turn said conductors may be secured in any convenient manner. In this way, the magnetic lines of force passing from the projections $b$ of one pole $a$, to those of the other pole will alternately flow through the armature $c$ and segments $d$, as clearly illustrated in the drawing. By the employment of the magnetic flux conductors $d$, the variation of the flux in the armature-web is accelerated, while at the same time, the path of the lines of force is practically closed at all times. From Figs. 1 to 8 it is apparent that during each revolution of the armature, the lines of force pass the armature-web twice in the same direction, and twice in the opposite direction, thus causing four current maxima to be generated.

In order to increase the number of current maxima, either one or both poles of armature $c'$ may be provided with peripheral recesses $e$, Fig. 9 showing both poles provided with such recesses. In this way, one pole of armature $c'$ has a pair of polar projections $g$, $h$, while its other pole has a pair of similar projections $i$, $k$. The magnet shank $a'$ is provided with a pair of polar projections $p$, $q$, while shank $a''$ has the corresponding projections $t$, $u$. If the polar projections $g$, $k$ of armature $c'$ are respectively located opposite projections $q$, $u$, the magnetic lines of force will pass from shank $a'$ through the polar projections $q$, $g$, the web of armature $c'$ and projections $k$, $u$ to shank $a''$. During the continued rotation of armature $c'$, the projections $q$, $u$ are opposed by recesses $e$, so that no lines of force will pass through the armature-web. In order to prevent an uninterrupted flow of the magnetic lines of force, shanks $a'$, $a''$ are provided with auxiliary polar projections $r$, $s$ respectively, so that the flux conductors $d$ will temporarily connect shanks $a'$, $a''$ by bridging projections $p$, $s$ and $t$, $r$. The polar projections $p$, $q$ and $t$, $u$ will next be opposed by the projections $g$, $h$ and $k$, $i$ respectively, so that the magnetic lines of force will again flow through the armature web. During the continued rotation of the armature, said lines of force will disappear in its web, and flow instead from projection $p$ to projection $s$ through armature projection $g$, and from projection $r$ to projection $t$ through projection $k$. Finally the polar projections $p$, $t$ are opposed by the projections $h$, $i$, so that the lines of force will again pass the armature-web, the operation above described comprising one half of a complete rotation. During this period, the lines of force have passed the armature-web three times in the same direction, while during the other half of said complete rotation, the lines of force will pass the web three times in the opposite direction, so that six current maxima will be generated during each revolution of the armature.

In Fig. 10, the armature $c'$ is identical with the armature shown in Fig. 9, while the magnet shanks $a'''$ and $a''''$ are provided with polar projections $v$, $w$ and $x$, $y$ respectively, which are so arranged that during each half rotation, the magnetic flux first passes twice in succession through one pair of diametrically opposed projections of the armature poles and the armature web, and then passes twice through the other pair of such poles and through the web. In other words, the magnetic lines of force will consecutively flow during each half rotation through firstly the parts $v$, $g$, $c'$, $k$, $x$; secondly the parts $v$, $g$, $y$, and $w$, $k$, $x$; thirdly the parts $w$, $k$, $c'$, $g$, $y$; fourthly the parts $v$, $h$, $c'$, $i$, $x$; fifthly the parts $v$, $h$, $y$ and $w$, $i$, $x$; sixthly the parts $w$, $i$, $c'$, $h$, $y$, and seventhly the parts $v$, $d$, $y$ and $w$, $d$, $x$. As the magnetic flux in the second, fifth and seventh instances does not pass armature-web $c'$, it is obvious that only the four remaining instances will generate as many current maxima, so that eight of such maxima will be obtained during each complete revolution of the armature.

I claim:

1. A dynamo electric machine comprising a bipolar field magnet, each shank of which is provided with a plurality of polar projections of like sign, a bipolar armature rotatable opposite said projections, and magnetic flux conductors carried by the armature and arranged intermediate the armature poles, said flux conductors being magnetically insulated from the armature.

2. A dynamo electric machine comprising a bipolar field magnet at least one shank of which is provided with a plurality of polar projections of like sign, a double T armature rotatable opposite said projections, and magnetic flux conductors carried by the armature and magnetically insulated therefrom.

3. A dynamo electric machine comprising a bipolar field magnet each shank of which is provided with a plurality of polar projections of like sign, an armature having recessed pole pieces that are adapted to be moved past said projections, and magnetic flux conductors carried by the armature and magnetically insulated therefrom, said flux conductors being also adapted to be moved past the polar projections.

EUGEN HELD.

Witnesses:
FRIDA KLAIBER,
ERNEST ENTENMANN.

---

Copies of this patent may be obtained for five cents each, by addressing the "Commissioner of Patents, Washington, D. C."